US006755340B1

(12) United States Patent
Voss et al.

(10) Patent No.: US 6,755,340 B1
(45) Date of Patent: Jun. 29, 2004

(54) METHOD AND ARRANGEMENT FOR PROCESSING NEGOTIABLE INSTRUMENTS

(75) Inventors: Hans-Günther Voss, Paderborn (DE); Heinz Ademmer, Geseke (DE); Martin Löser, Paderborn (DE)

(73) Assignee: Wincor Nixdorf GmbH & Co. KG, Paderborn (DE)

( * ) Notice: Subject to any disclaimer, the term of this patent is extended or adjusted under 35 U.S.C. 154(b) by 0 days.

(21) Appl. No.: 09/890,361

(22) PCT Filed: Feb. 2, 2000

(86) PCT No.: PCT/DE00/00319

§ 371 (c)(1), (2), (4) Date: Jul. 27, 2001

(87) PCT Pub. No.: WO00/46764

PCT Pub. Date: Aug. 10, 2000

(30) Foreign Application Priority Data

Feb. 4, 1999 (DE) ........................................ 199 04 536

(51) Int. Cl.[7] ............................................... G06F 17/60

(52) U.S. Cl. ............................ 235/379; 902/8; 902/17; 902/12; 902/13; 902/14; 902/15

(58) Field of Search ................................ 235/378, 379, 235/381, 382, 385; 382/137, 139, 135, 136, 140; 902/18, 9, 10, 11, 12, 13, 15, 16, 17; 705/43

(56) References Cited

U.S. PATENT DOCUMENTS 4,023,011 A * 5/1977 Nakajima et al. ........... 235/478
4,743,743 A * 5/1988 Fukatsu ...................... 235/379
5,252,811 A * 10/1993 Henochowicz et al. ..... 235/379
5,751,842 A * 5/1998 Riach et al. ................ 382/137
5,918,720 A * 7/1999 Robinson et al. ........... 194/206
6,039,246 A * 3/2000 Mukai ........................ 235/379

FOREIGN PATENT DOCUMENTS

| | | | | |
|---|---|---|---|---|
| DE | 39 09 323 A1 | 9/1990 | G07F/17/00 |
| DE | 195 30 602 A1 | 2/1997 | G07F/3/02 |
| DE | 298 12 793 U1 | 11/1998 | G07F/19/00 |
| EP | 0 606 959 A2 | 1/1994 | G07F/19/00 |
| EP | 0 633 553 A1 | 7/1994 | G07D/7/00 |
| EP | 0 845 763 A1 | 6/1998 | G07D/11/00 |
| GB | 0845763 A1 * | 3/1998 | |
| WO | WO 97/13225 | 4/1997 | G07D/11/00 |
| WO | WO 9859308 A1 * | 12/1998 | |
| WO | WO 98/59308 | 12/1998 | G06F/17/60 |

* cited by examiner

*Primary Examiner*—Karl D. Frech
*Assistant Examiner*—Daniel Walsh

(57) ABSTRACT

A method and arrangement for processing negotiable instruments (20) such as banknotes or monetary payment forms in an automatic banking machine (10), having the features:

Figure 1:
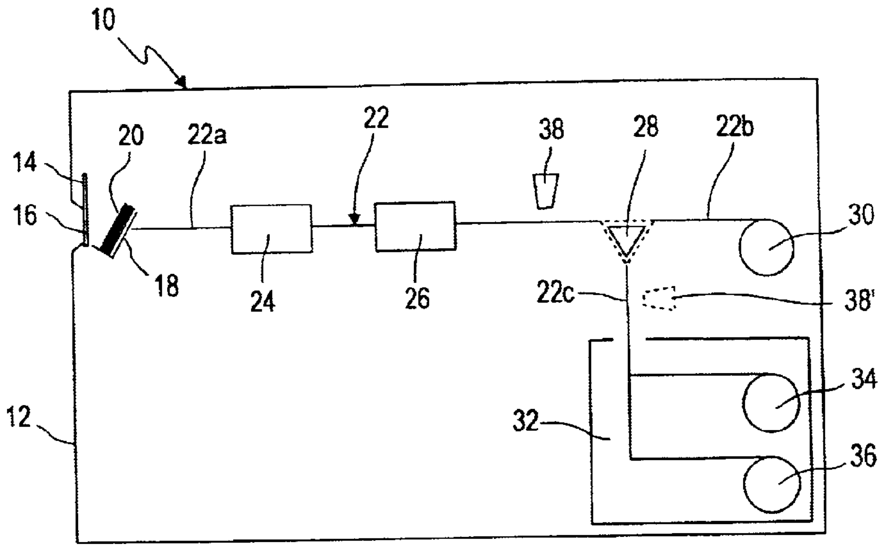

Inserting the negotiable instruments (20) into an input compartment (18), setting a control criterion on the basis of the type of negotiable instruments (20) to be processed, transporting the negotiable instruments (20) one after the other from the input compartment (18) and through a negotiable instrument recording device (24, 26) into a temporary store (30); the nominal value of banknotes is stored in a value store, payment forms are depicted and the image data stored in an image store; depositing the negotiable instruments (20) from the temporary store (30) in at least one secure store (34, 36) after completion of a deposit operation.

28 Claims, 1 Drawing Sheet

METHOD AND ARRANGEMENT FOR PROCESSING NEGOTIABLE INSTRUMENTS

The invention relates to a method and an arrangement for processing negotiable instruments.

It is a desire to be able to deliver relatively large amounts of money, for example the daily income of a trading house, which contains both cash and monetary payment forms such as checks or credit notes, at a financial institute, even after the end of business. This has previously been done in the deposit process, as it is called, in which cash and monetary payment forms are put into a deposit envelope or a strong box and this container is thrown into a deposit slot belonging to the financial institute. Although this provides safe keeping of the amount of money, it does not provide its recording in terms of value and credit to an account belonging to the depositor. This normally takes place only on the next working day of the financial institute, and the depositor in the worst case suffers a loss of interest of a number of days.

WO 97/13225 A1 discloses an automatic money receiving and dispensing machine, into which banknotes can be put and, following authenticity checking and determination of the value, can be kept safe. The automatic banking machine contains, inter alia, a banknote receiving point and a transport device for banknotes, a banknote checking and recognition device, a temporary store and a multiplicity of storage units for the safe keeping of the banknotes. The known automatic banking machine is suitable only for recording and depositing banknotes.

EP 0 606 959 A2 describes a device for the deposition of deposit envelopes and individual documents, which is equipped with an input slot, a printing device for deposit information, a magnetic scanner apparatus for scanning encoded information on individual documents, a plurality of storage units for the storage of deposit envelopes and individual documents and also an imaging apparatus for producing an image of an individual document. This device is not envisaged for the acceptance of banknotes. It is also disadvantageous that only a single document can be input at a time. Depositing a larger number of payment forms, for example the daily income of a trading house, would therefore last much too long. Being present for a long time at an automatic banking machine is already undesirable, for safety reasons. Furthermore, in order to input cash, an automatic banking machine suitable for the purpose additionally has to be found.

It is an object of the invention to specify a method which permits processing of banknotes and monetary payment forms, and to propose an arrangement for implementing this method.

The part of the object based on the method is achieved by the features of claim 1, and the part based on the arrangement is achieved by the features of claim 10.

The invention makes the processing of negotiable instruments of different types, that is to say both banknotes and monetary payment forms —for example checks or credit notes —possible in a single automatic banking machine equipped with an deposit function. The delivery of a relatively large number of banknotes and payment forms, for example the daily income of a trading house, can therefore be carried out with one input operation if the automatic banking machine is designed to process mixed stacks of negotiable instruments, or otherwise in two successive input operations for banknotes and payment forms. By means of a closure flap in front of the input compartment, the negotiable instruments placed therein are removed from access, so that the security expectations of the depositor are fulfilled.

The method according to the invention therefore begins with the insertion of negotiable instruments in the input compartment. They may be both a single example or a stack of banknotes or monetary payment forms. Since banknotes and monetary payment forms are treated differently, as will be described further below, the setting of a control criterion for an electronic processing device is carried out on the basis of the type of negotiable instruments to be processed. In the simplest case, this setting can be carried out by actuating a selection switch before the removal of the first negotiable instrument from the input compartment.

According to an alternative expression of the method, the setting of the control criterion is carried out after the removal of a negotiable instrument from the input compartment, and with the aid of a sensor which is able to distinguish at least between banknotes and other sheet materials.

The negotiable instruments are therefore taken one after another from the input compartment and transported through a negotiable instrument recording device into a temporary store, banknotes being checked for authenticity in a banknote checking and recognition device and their nominal value being recorded and the latter stored in a value store. Payment forms, on the other hand, are depicted in an image recording station, and the data representing the depiction is stored in an image store. The negotiable instruments are transported from the temporary store into at least one secure deposit store at the latest after a deposit operation has been completed.

According to a preferred embodiment of the method, each payment form depicted during the input operation is displayed on a visual display unit. According to a first development of this method step, with the aid of a character recognition method, information printed and/or written on the payment form is converted into DP-processable information and the latter is indicated in plain text in a subarea of the visual display unit. According to an alternative development of the aforementioned method step, with the aid of keyboard inputs, the information printed and/or written on the payment form is transferred by the visual display unit into the aforementioned subarea of the visual display unit and depicted there. The plain-text information recorded in accordance with one of the alternative developments and depicted in plain text in the subarea can, if appropriate, be corrected with the aid of keyboard inputs, and then its agreement with the information printed and/or written on the payment form can be confirmed.

Since the amount mentioned on the payment forms can be checked, corrected if necessary and confirmed as correct by the depositor, it can immediately be credited to the account of the depositor. At the same time, it is of course possible that the credit will be made only after the clearance of the monetary payment form. This is in any case conventional when depositing, for example, checks at the bank counter. The number of the benefiting account was made known to the automatic banking machine at the beginning of the deposit operation in a known way by inserting a chip card or magnetic-strip card into a card reader belonging to the automatic banking machine. The financial institute is protected against error and attempted fraud by the knowledge of the account of the depositor and his confirmation. In order additionally to provide the depositor with security with respect to the financial institute, in an additional method step, the depiction of each payment form, on its own or together with the information depicted in the subarea of the visual display unit, can be printed onto an deposit receipt, and the latter can be made available to the depositor.

After the accounting operation, the payment forms are conveyed into a secure storage unit. Before or during the transport of the payment form to said unit, according to a development of the invention, it is printed with an item of canceling information, so that it cannot be presented again unnoticed.

An arrangement suitable for implementing the method comprises an input compartment which can be closed by a closure flap and has a following transport path for negotiable instruments, a banknote checking and recognition device arranged on the transport path, an image recording station, arranged on the transport path, with a video camera for recording the image of payment forms, an image store for storing the video image data about a payment form, a temporary store for negotiable instruments, arranged downstream of the banknote checking and recognition device and the image recording station, at least one deposit store for negotiable instruments, a generator for a control criterion representing a type of negotiable instrument, and a value store, at least for the nominal value of a recognized banknote.

According to a preferred development of the arrangement, a diverter is arranged on the transport path and, in a first position, connects the temporary store to the input compartment or an output compartment and, in a second position, connects the temporary store to the at least one deposit store. In its first position, the diverter permits the introduction of the negotiable instruments taken from the input compartment into the temporary store and their transport back, for example following the abortion of an deposit operation, into the input or the additional output compartment. In the second position of the diverter, after a deposit operation has been concluded, the temporarily stored negotiable instruments are deflected into the deposit store or stores, where they are kept safe.

Corresponding to a development of the arrangement, the banknote checking and recognition device is arranged upstream of the image recording station, and a negative banknote recognition signal, that is to say a signal with the content "the sheet materials passing through are not a banknote" serves as an activation signal for the image recording station.

According to an alternative development of the arrangement, the video camera is arranged in the banknote checking and recognition device. It produces a depiction of each negotiable instrument passing through said device. The video image data about a depicted negotiable instrument is stored in the image store only in the case of a negative banknote recognition signal. Since it is already established, after the scanning has advanced by a few millimeters relative to the sheet materials, whether the latter is a banknote in this case, the storage of the relevant part of the image data can be carried out in real time.

According to another development of the arrangement, the latter is equipped with a visual display unit for displaying a payment form by using the video image data and a keyboard for registering or correcting and confirming the correctness of information taken from the display of the payment form on the visual display unit. In addition, the arrangement may comprise a keyboard and/or a card reader for the input of an account number into a computer managing accounts.

The image recording station comprises a video camera. This can be designed as a full image camera. However, since the payment form is moved through the image recording station, the video camera can also be designed as a line-scan camera without, for this purpose, additional outlay arising for advancing the payment form line by line relative to the video camera.

Figure 2:
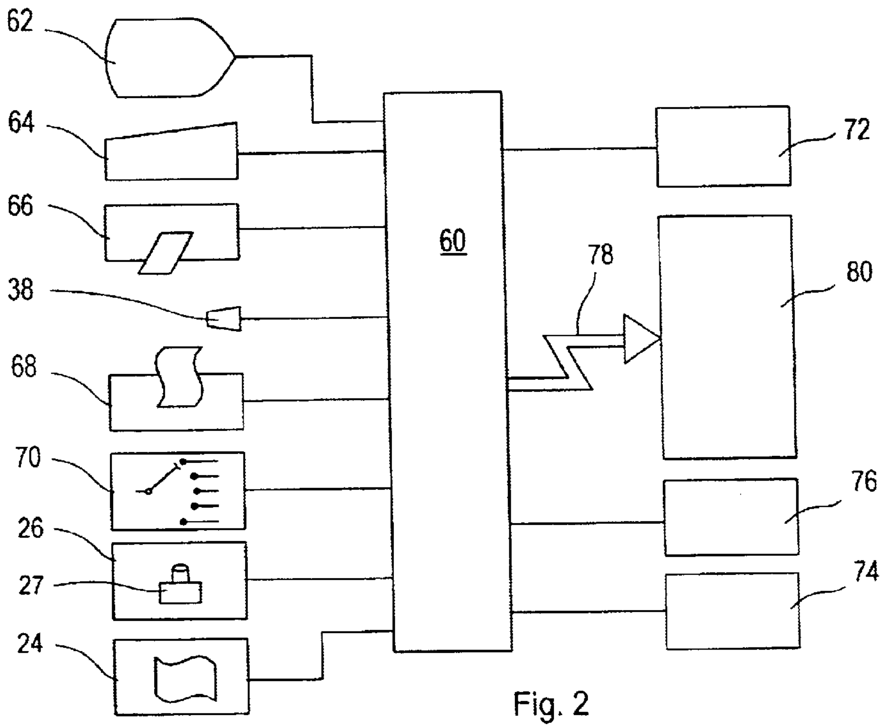

Further features and advantages of the invention emerge from the following description of an exemplary embodiment, which will be explained by using the drawing, in which:

FIG. 1 shows the parts essential to the invention of an automatic banking machine equipped to process negotiable instruments, in a schematic illustration, FIG. 2 shows a block diagram of the arrangement shown in FIG. 1.

FIG. 1 shows an automatic banking machine 10 equipped for the processing of negotiable instruments, in schematic form. Let into a device wall 12 which faces the person depositing a negotiable instrument, is an opening 16 which can be closed by a closure flap 14 and behind which there is an input compartment 18 for negotiable instruments 20. The latter may be banknotes or else monetary payment forms, such as checks or credit notes.

The input compartment 18 is followed by a transport path 22 for the negotiable instruments 20, with subsections *22a*, *22b* and *22c*. The first subsection *22a* extends from the input compartment 18, through a banknote checking and recognition device 24 and a subsequent image recording station 26, as far as a diverter 28. The second subsection *22b* leads from diverter 28 to a temporary store 30, and the third subsection *22c* leads from the diverter 28 into a secure container 32, in which a banknote store 34 and a payment forms store 36 are accommodated. The number of stores is to be understood as an example: a separate store can be provided in each case for each banknote value, for checks and credit notes, or else a single store for all the negotiable instruments. A printing station 38 or 38' for printing an item of canceling information on a payment form received is optionally arranged on the subsection *22b* or *22c* of the transport path 22.

FIG. 2 shows a block diagram of the electrical part of the automatic banking machine 10. An electronic processing device is designated therein by 60. Connected to said device are the banknote checking and recognition device 24, the image recording station 26 with a video camera 27, the printing station 38, a visual display unit 62, an alphanumeric keyboard 64, a card reader 66 for chip cards or magnetic strip cards, a receipt printer 68 and a selection switch 70, with which a control criterion with respect to the type of negotiable instruments 20 to be processed can be set. In addition, the processing device 60 controls the drives, not illustrated in FIG. 1, for the closure flap 14, the transport path 22, the diverter 28, the temporary store 30 and the stores 34, 36. Connected to the processing device 60 are a value store 72 for storing, inter alia, the nominal values of received banknotes, an image store for storing the image data supplied by the video camera 27, and a character recognition device 76 for converting information printed and/or written on a payment form into DP-processable information data. The latter is likewise stored in the value store 72. Finally, the processing device 60 is also connected via a remote data link 78 to a computer 80 managing accounts.

The processing of negotiable instruments proceeds as follows:

The depositor inserts his customer card into the card reader 66 and, using the selection switch 70, determines the mode of operation of the automatic banking machine 10, in the present example the deposit of banknotes or credit notes. The processing device 60 then opens the closure flap 14, the depositor then places his negotiable instruments 20 into the input compartment 18 and operates a command key "start processing". The closure flap 14 is closed and the negotiable instruments 20 are withdrawn one after another from the input compartment 18. An input/output unit for negotiable instruments, which also contains a withdrawal device, is described in WO 97/13225 A1.

The negotiable instruments 20 are channelled into the first section 22*a* of the transport path and are guided on the latter, initially through the banknote checking and recognition device 24 and then through the image recording station 26. If the selection switch 70 was used to set the mode of operation "deposit banknotes", then the banknote checking and recognition device 24 checks the authenticity of the banknotes passing through and determines their nominal value. The latter is stored in the value store 72. If the selection switch 70 was used to set the mode of operation "deposit payment form" then the video camera 27 incorporated in the image recording station 26 depicts the payment form passing through and stores the video data representing the depiction in the image store 74.

The negotiable instruments 20 then pass, via the appropriately set diverter 28, into the temporary store 30, where they are stored until the end of the deposit operation. If the deposit operation was aborted, the negotiable instruments stored in the store 30 are conveyed, over the transport path 22*b*, 22*a*, to an output compartment (not illustrated) which is likewise described in WO 97/13225 A1. If the deposit operation was concluded properly, the subsection 22*b* of the transport path is connected to the subsection 22*c*, and therefore the temporary store 30 is connected to the banknote store 34 or the payment forms store 36. The negotiable instruments 20 stored in the temporary store 30 are then conveyed into the appropriate stores 34, 36.

The video data representing the depiction of the payment forms stored in the image store 34 is fed to the character recognition device 36 and, in the latter, is searched for printed and/or written information. The latter is converted into digital data and at least the monetary value printed on the payment form is saved in the value store 72. The character recognition device 76 can be implemented as a self-contained device or else in software in the processing device 60.

The depiction of the payment forms is depicted in a first subarea of the visual display unit 62 by using the video data stored in the image store 74, and the information detected by the character recognition device 76 is depicted in a second subarea of the visual display unit 62. If, because of poor image quality of the payment form, the character recognition device 76 does not supply any information, or the wrong information, or a character recognition device is not provided in the automatic banking machine, the information printed and/or written on the payment form can be read from the visual display unit 62 and, with the aid of the keyboard 62, can be transferred into the aforementioned subarea of the visual display unit and depicted there. Furthermore, with the aid of the keyboard 64, the plain-text information depicted in the subarea can be corrected. In order to add the value entered on the payment form to the account of the depositor, the agreement between the information displayed in the second subarea of the visual display unit 62 and the information printed and/or written on the payment form must be confirmed by a keyboard input. After a deposit operation has been concluded, the content of the value store 72, together with the number of the account to be credited, is transmitted via the remote data link 78 to the computer 80 managing the account.

The depiction of each payment form, on its own or together with the information depicted in the second subarea of the visual display unit 62, is printed on a deposit receipt with the aid of the receipt printer 68, and said receipt is made available to a depositor.

A received payment form, before being deposited in the payment form store 36, is provided in the printing station 38 with a cancellation imprint. If the return of a payment form stored in the temporary store 30 should not be possible, then the printing station can be arranged on the subsection 22*a* or 22*b* of the transport path 22. Otherwise, the printing station is arranged on the subsection 22*c* of the transport path 22, as illustrated dashed at 38'. The payment forms are then canceled only during the transport from the temporary store 30 into the payment form store 36. This ensures that a payment form which has not been registered keeps its value.

What is claimed is:

1. A method of processing negotiable instruments (20) including banknotes and monetary payment forms in an automatic banking machine (10) equipped with a counting-in function, having the features:

inserting a respective one of single negotiable instruments and a stack of negotiable instruments (20) into an input compartment (18) said input compartment being configured to allow the stack of negotiable instruments to be inserted into the input compartment together in a single operation, setting a control criterion for an electronic processing device (60) on the basis of the type of negotiable instruments (20) to be processed, removing the negotiable instruments (20) one after another from the input compartment (18) and transporting them through at least one negotiable instrument recording device (24, 26) into a temporary store (30)

banknotes being checked for authenticity and their nominal value being recorded and stored in a value store (72), payment forms being depicted and the data representing the depiction being stored in an image store (74), transporting the negotiable instruments (20), at the latest after completion of a deposit operation, from the temporary store (30) into at least one store (34, 36) for their safe keeping, characterized in that while the negotiable instruments (20) are passing through the negotiable instrument recording device (24, 26), the latter itself generates the control criterion, the authenticity of the banknotes is checked and their nominal value is recorded, and payment forms are depicted and the data representing the depiction is stored.

2. The method as claimed in claim 1, in which the control criterion is set before the removal of the first negotiable instrument (20) from the input compartment (18) and by operating a selection switch (70).

3. The method as claimed in claim 1, in which the control criterion is set after the removal of a negotiable instrument (20) from the input compartment (18) and with the aid of a sensor which is able to distinguish at least between banknotes and other sheet materials.

4. The method as claimed in claim 1, in which an image of each payment form depicted during its transport from the input compartment 18 to the temporary store (30) is displayed on a visual display unit (62).

5. The method as claimed in claim 4, in which information written and/or printed on the payment form is converted into DP-processable information with the aid of a character recognition method and this information is displayed in plain text in a subarea of the visual display unit (62).

6. The method as claimed in claim 4, in which, with the aid of keyboard inputs, the information printed and/or written on the payment form is transferred by the visual display unit (62) into a/the subarea of the visual display unit (62) and depicted there, or the plain-text information depicted in the subarea is corrected and then its agreement with the information printed and/or written on the payment form is confirmed.

7. The method as claimed in claim 6, in which the depiction of each payment form, on its own or together with the information depicted in the subarea of the visual display unit (62), is printed on an deposit receipt and the latter is made available to the depositor.

8. The method as claimed in claim 1, in which the payment form, before or during the transport into the secure store (36), is printed with an item of canceling information.

9. The method as claimed in claim 1, in which, before the processing of a first negotiable instrument (20), the number of an account to which the negotiable instruments (20) to be accepted are to be credited is made known to the electronic processing device (60).

10. An arrangement for implementing the method as claimed in claim 1, comprising an input compartment (18), which can be closed by a closure flap (14), with a following transport path (22) for negotiable instruments (20), a banknote checking and recognition device (24) arranged on the transport path (22), an image recording station (26) arranged on the transport path (22) and having a video camera (27) for recording the image of payment forms, an image store (74) for storing the video image data about a payment form, a temporary store (30) for negotiable instruments (20), arranged downstream of the banknote checking and recognition device (24) and the image recording station (26), at least one deposit store (34, 36) for negotiable instruments (20), a generator (70 for a control criterion representing a type of negotiable instrument, a value store (72), at least for the nominal value of a recognized banknote.

11. The arrangement as claimed in claim 10, having a diverter (28) which is arranged on the transport path (22) and, in a first position, connects the temporary store (30) to the input compartment (18) or an output compartment and, in a second position, connects the temporary store (30) to the at least one secure store (34, 36).

12. The arrangement as claimed in claim 10, on whose transport path (22) a printing device (38; 38') is arranged.

13. The arrangement as claimed in claim 10, having a generator for the control criterion, designed as a selection switch (70).

14. The arrangement as claimed in claim 10, in which the generator for the control criterion is designed as a sensor which is arranged on the transport path and is able to distinguish at least between a banknote and other sheet material.

15. The arrangement as claimed in claim 10, in which the banknote checking and recognition device (24) is arranged upstream of the image recording station (26), and a negative banknote recognition signal serves as an activation signal for the image recording station (26).

16. The arrangement as claimed in claim 10. in which the video camera (27) is arranged in the banknote checking and recognition device (24) and produces a depiction of each negotiable instrument (20) passing through the latter.

17. The arrangement as claimed in claim 16, in which the video image data about a depicted negotiable instrument (20) is stored in the image store (74) only in the event of a negative banknote recognition signal.

18. The arrangement as claimed in claim 10, having a visual display unit (62) for displaying a payment form by using the video image data, and a keyboard (64) for recording or correcting and confirming information taken from the display of the payment form on the visual display unit (20).

19. The arrangement as claimed in claim 10, whose image recording station (26) comprises a video camera (27) designed as a full image camera or a line-scan camera.

20. The arrangement as claimed in claim 10, having a keyboard and/or a card reader (66) for the input of an account number into a computer (80) managing accounts.

21. A method of processing negotiable instruments (20) such as banknotes or monetary payment forms in an automatic banking machine (10) equipped with a counting-in function, having the features:

inserting a single example or a stack of negotiable instruments (20) into an input compartment (18), setting a control criterion for an electronic processing device (60) on the basis of the type of negotiable instruments (20) to be processed, removing the negotiable instruments (20) one after another from the input compartment (18) and transporting them through at least one negotiable instrument recording device (24, 26) into a temporary store (30), capturing an image of each payment form depicted during its transport from the input compartment 18 to the temporary store (30) and displaying the image on a visual display unit (62), manually inputting information printed and/or written on the payment form the information being transferred by the visual display unit (62) into a subarea of the visual display unit (62) and depicted there, or the plain-text information depicted in the subarea is corrected and then its agreement with the information printed and/or written on the payment form is confirmed, banknotes being checked for authenticity and their nominal value being recorded and stored in a value store (72), payment forms being depicted and the data representing the depiction being stored in an image store (74), and transporting the negotiable instruments (20), at the latest after completion of a deposit operation, from the temporary store (30) into at least one store (34, 36) for their safekeeping.

22. An arrangement for implementing the method as claimed in claim 21, comprising an input compartment (18), which can be closed by a closure flap (14), with a following transport path (22) for negotiable instruments (20), a banknote checking and recognition device (24) arranged on the transport path (22), an image recording station (26) arranged on the transport path (22) and having a video camera (27) for recording the image of payment forms, an image store (74) for storing the video image data about a payment form, a temporary store (30) for negotiable instruments (20), arranged downstream of the banknote checking and recognition device (24) and the image recording station (26), at least one deposit store (34, 36) for negotiable instruments (20), a generator (70 for a control criterion representing a type of negotiable instrument, a value store (72), at least for the nominal value of a recognized banknote.

23. The arrangement as claimed in claim 22, having a diverter (28) which is arranged on the transport path (22) and, in a first position, connects the temporary store (30) to the input compartment (18) or an output compartment and, in a second position, connects the temporary store (30) to the at least one secure store (34, 36).

24. The arrangement as claimed in claim 22, in which the generator for the control criterion is designed as a sensor which is arranged on the transport path and is able to distinguish at least between a banknote and other sheet material.

25. The arrangement as claimed in claim 22, in which the banknote checking and recognition device (24) is arranged upstream of the image recording station (26), and a negative banknote recognition signal serves as an activation signal for the image recording station (26).

26. The arrangement as claimed in claim 22, in which the video camera (27) is arranged in the banknote checking and recognition device (24) and produces a depiction of each negotiable instrument (20) passing through the latter.

27. The arrangement as claimed in claim 26, in which the video image data about a depicted negotiable instrument (20) is stored in the image store (74) only in the event of a negative banknote recognition signal.

28. The arrangement as claimed in claim 22, having a visual display unit (62) for displaying a payment form by using the video image data, and a keyboard (64) for recording or correcting and confirming information taken from the display of the payment form on the visual display unit (20).

* * * * *